United States Patent [19]

Lee et al.

[11] Patent Number: 5,202,880
[45] Date of Patent: Apr. 13, 1993

[54] DOUBLE-SIDED MAGNETO-OPTICAL MEDIA FOR A MULTI-DISK STORAGE DEVICE

[75] Inventors: Neville K. Lee, Sherbourn; Brian Tan, Westboro, both of Mass.

[73] Assignee: Digital Equipment Corporation, Maynard, Mass.

[21] Appl. No.: 847,526

[22] Filed: Mar. 6, 1992

[51] Int. Cl.$^5$ .............................................. G11B 7/24
[52] U.S. Cl. ............................. 369/275.4; 369/275.2; 369/277; 369/283; 369/286; 428/694; 428/900
[58] Field of Search .................... 428/162, 64, 65, 76, 428/412, 426, 694, 900; 369/13, 14, 275.4, 284, 286, 288, 282, 283, 275.1, 275.2, 277

[56] References Cited

U.S. PATENT DOCUMENTS

| | | | |
|---|---|---|---|
| 4,441,179 | 4/1984 | Slaten | 369/275.5 |
| 4,658,392 | 4/1987 | Langowski et al. | 369/288 |
| 4,893,910 | 1/1990 | Birecki | 359/282 |
| 5,059,473 | 10/1991 | Takahashi et al. | 428/162 |
| 5,087,340 | 2/1992 | Onagi et al. | 428/694 |
| 5,093,174 | 3/1992 | Suzuki et al. | 428/64 |
| 5,094,925 | 3/1992 | Ise et al. | 428/694 |
| 5,100,741 | 3/1992 | Shimoda et al. | 428/694 |
| 5,109,377 | 4/1992 | Yamamoto et al. | 369/288 |
| 5,112,701 | 5/1992 | Katsuragawa | 428/694 |
| 5,143,797 | 9/1992 | Hashima et al. | 428/694 |

*Primary Examiner*—David P. Porta
*Assistant Examiner*—Kim-Kwok Chu
*Attorney, Agent, or Firm*—Ronald E. Myrick; Barry N. Young; Dirk Brinkman

[57] ABSTRACT

A low-profile magneto-optical media for double sided recording of information. The media comprises a single polycarbonate substrate having a relief in the form of tracking grooves or sampled-servo pits on each side surface thereof. Formed on each relief surface are thin-film active layers including a reflective layer, a transparent dielectric layer, a magneto-optical recording layer, and a transparent protective layer. The reflective layer is preferably formed of aluminum alloy. The dielectric layer is preferably formed of aluminum nitride or silicon nitride. The recording layer is formed of an amorphous vertically oriented magnetic material, preferably a rare-earth transition-metal alloy, for example, Tb-Fe-Co. The protective outer layer is formed of a transparent anti-corrosive material specifically compatibly with an air-bearing, low-flying, read/write head, preferably silicon nitride.

24 Claims, 4 Drawing Sheets

DOUBLE-SIDED MAGNETO-OPTICAL MEDIA FOR A MULTI-DISK STORAGE DEVICE

FIELD OF THE INVENTION

This invention relates to optical storage media, and more particularly to a multi-disk optical storage device having magnetooptical recording layers on both sides thereof.

BACKGROUND OF THE INVENTION

Like attics and garages, disk storage systems always seem to be full. As technical development continuously moves to greater storage capacities to keep pace with increased demand, the construction and arrangement of the recording media must likewise be improved.

A conventional high capacity magnetic disk storage system typically includes a plurality of disks spaced axially on a rotationally mounted spindle. Disk storage systems attain high storage densities by utilizing the maximum number of data surfaces for recording information within a given volume. For example, an industry-standard "5 ¼ inch" disk storage system may store 600 MB on five disks, each disk storing 60 MB on each of its two surfaces. The number of disks that can be accommodated within a given form factor, or industry standard dimensions are limited by the height of the disk stack, the spacing between the disks, and the thickness of the disks. High storage density magnetic disks typically use low-flying air-bearing read/write heads. For this reason the roughness or asperity of the magnetic disk surface is kept to a minimum. To ensure reliable operation, asperities are generally maintained at less than 60% of the head fly height. Likewise, static build-up on the magnetic surface of the disk is kept to a minimum to minimize static-friction ("stiction") which would tend to interfere with the flying of the heads.

Conventional optical storage systems have realized high storage capacities by virtue of the fact that optical recording techniques allow recording densities substantially greater than those used with magnetic media. Optical storage systems have evolved from write-once, read-only to systems that have rewritable capabilities. The introduction of magneto-optical ("M-O") media in particular, permits dynamic and bit wise modification of information after it has been initially recorded.

In a typical M-O storage system information is recorded on the media by directing a relatively intense, focused beam of light through an optically transparent substrates (substrate incident) at a small domain in a recording layer. The recording layer is generally an amorphous, vertically oriented, magnetic film preferably made of a rare-earth transition-metal alloy, such as Tb-Fe, Tb-Fe-Co, Gd-Co, Gd-Tb-Fe, or Gd-Fe. When the domain is heated to a Curie temperature in the presence of an external biased magnetic field, the domain is magnetically polarized to align with the external magnetic field. At the end of a write pulse the heated domain cools down and regains its permanent character, storing information as a vertically oriented magnetic domain. The orientation of the domain, up or down, indicates either a logical 1 or 0.

Information is read from the recording layer by directing a less intense beam of polarized light through the substrate at the recording layer. The polarization of the beam of light is partially rotated, for example, a fraction of a degree clockwise, or counterclockwise. by the magnetically oriented domains of the recording layer by either the Kerr or the Faraday effect. In the Kerr effect the incident lightbeam is reflected at the recording layer; in the Faraday effect the polarized lightbeam passes through the material rather than being reflected from its surface. The return lightbeam essentially retraces its path to a differential detector which decodes the polarization-modulated light-beam into bits of information.

A typical M-O storage device may store, for example, 600 MB on a single surface of one 5 ¼ inch disk. However, optical path restrictions, and dimensional limitations related to the optical components, that is the various lasers, lenses, mirrors, beam splitters, and prisms, have generally not allowed the use of closely spaced multi-disk arrangements in compact industry standard packages such as those which are commonly used for magnetic storage devices. Also, because of their relative size, the optical read/write components of known systems are relatively remote from the media surface, and therefore surface asperity and stiction have generally not been a major concern in optical media design.

Increased capacity optical storage systems have typically used, for example, juke-box type of mechanical means that tediously present single disks to the optical system for writing and reading information. Some optical storage systems which do use double-sided disks include means for flipping the disk over to permit access to both sides of the disks by a single fixed optical system. At an increased cost, such double-sided disk systems have been provided with duplicate optical systems to permit simultaneous access to both sides of the disks. Alternative solutions include systems where the optical system is mounted on a movable arm which can be positioned axially to select a surface, and radially to access information recorded on one of the disk surfaces.

For these, and other reasons, optical storage systems are typically more amenable with applications that use sequential access to the recorded information, such as CDs, video disks, and archival storage systems. In general, optical storage systems have not concerned themselves with minimizing the spacing between the disks, and reducing the thickness of the disks to permit the construction of a compact high capacity, random access, multi-disk optical storage device.

For M-O storage systems that do use double-sided media to increase their recording capacities, the double-sided disk is typically nothing more than two single sided disks meticulously arranged with one another in a confronted relationship. Each disk in such a paired arrangement includes an optically transparent substrate with spiral or concentric grooves formed on one surface thereof. The grooves provide the disk with a pre-formatted structure for storing information.

The signal recording layer is deposited on the grooved surface of each disk. The two, thus fabricated, single sided disks are then carefully aligned and bonded to each other with the signal recording layers being directed inwardly. The outwardly facing surfaces of the disks are usually coated with a protective layer, or lubricant to minimize corrosion, and wear and tear ("tribology"). The disadvantageous of such a double-side disk are numerous. Since this type of disk uses two substrates, the total thickness of the finished disk is at least twice the thickness of the substrate, increasing the total space required for using such a disk in a multi-disk configuration. The increased weight of the disk increases the time and power required to spin the disk up to operational speed, and subject the drive motor to undue wear and tear. For substrate incident media, the substrate must be formed by a carefully controlled injection molding process to produce good transmittance and birefringence characteristics. The requirement for precise alignment and registration of the two substrates furthermore decreases process yield while increasing process cycle time. In addition, the surface topology of known optical disks is generally too rough to be compatible with low-flying air-bearing read/write heads. Excessive asperity and stiction increase the probability of fatal collisions if used with a low-flying air-bearing read/write head, as are commonly used with magnetic storage systems.

Accordingly, the known medium for optical disk storage systems increase the cost of assembly, require a carefully controlled injection molding process, and moreover, are not compatible with compact high capacity, multi-disk storage devices using low-flying air-bearing read/write heads.

Therefore, it is desirable to provide a double-sided magneto-optical media which can be used with a multi-disk optical storage device which: is easy to manufacture with automated assembly equipment; uses minimal and inexpensive materials; is compatible with low-flying air-bearing read/write heads, and provides for an increased storage capacity without increasing the overall size of the system.

SUMMARY OF THE INVENTION

In accordance with one aspect of the invention, there is provided a low-profile magneto-optical media for double sided recording of information. The media comprises a single substrate having a preformatted relief in the form of tracking grooves or sampled-servo pits on each side surface thereof.

Formed on each of the reliefed side surfaces are the active layers of the media comprising thin-film materials which provide an optically transparent, low stiction, and asperity-controlled surface topology compatible with an air-incident lightbeam and a low-flying read/write head. The active thin-film layers, from the substrate outwards are a reflective layer, an optional transparent dielectric layer, a magneto-optical recording layer, and a transparent protective layer.

The reflective layer is preferably formed of aluminum alloy. The dielectric layer is preferably formed of aluminum nitride or silicon nitride. The recording layer is formed of an amorphous vertically oriented magnetic material, preferably a rare-earth transition-metal alloy, for example, Tb-Fe-Co. The protective outer layer is formed of a transparent anti-corrosive material having sufficiently low stiction surface characteristics, specifically compatible with an air-bearing, low-flying, read/write head, preferably silicon nitride and an air incident lightbeam. That is, the stiction characteristics of the surface are sufficiently weak that they allow a flying read/write head to fly at a predetermined low height.

According to another aspect of the present invention, the substrate surface is partitioned into annular grooved and non-grooved zones. During the dynamic loading and unloading of the read/write heads of the device, the heads are pre-positioned above the non-grooved or "loading" zone of the disk surface. Thus, should the heads accidentally touch down on the surface during loading or unloading information will not be damaged. Also, by providing the disk surface with a loading zone, the disk may be used with static contact start/stop heads which are, because of excessive wear and tear, generally not tribologically compatible with annular grooved surfaces, particularly if such surfaces are lubricated.

According to a further aspect of the invention, a plurality of single substrate, double-sided disks are spaced closely apart about a rotatably mounted spindle to provide at least ten recording surfaces for a M-O storage device in a 5¼ inch form factor package.

These and other features and advantages of the present invention will become apparent from a reading of the detailed description in conjunction with the attached drawings in which like reference numerals refer to like elements in the several views.

DETAILED DESCRIPTION OF THE INVENTION

Figure 1:
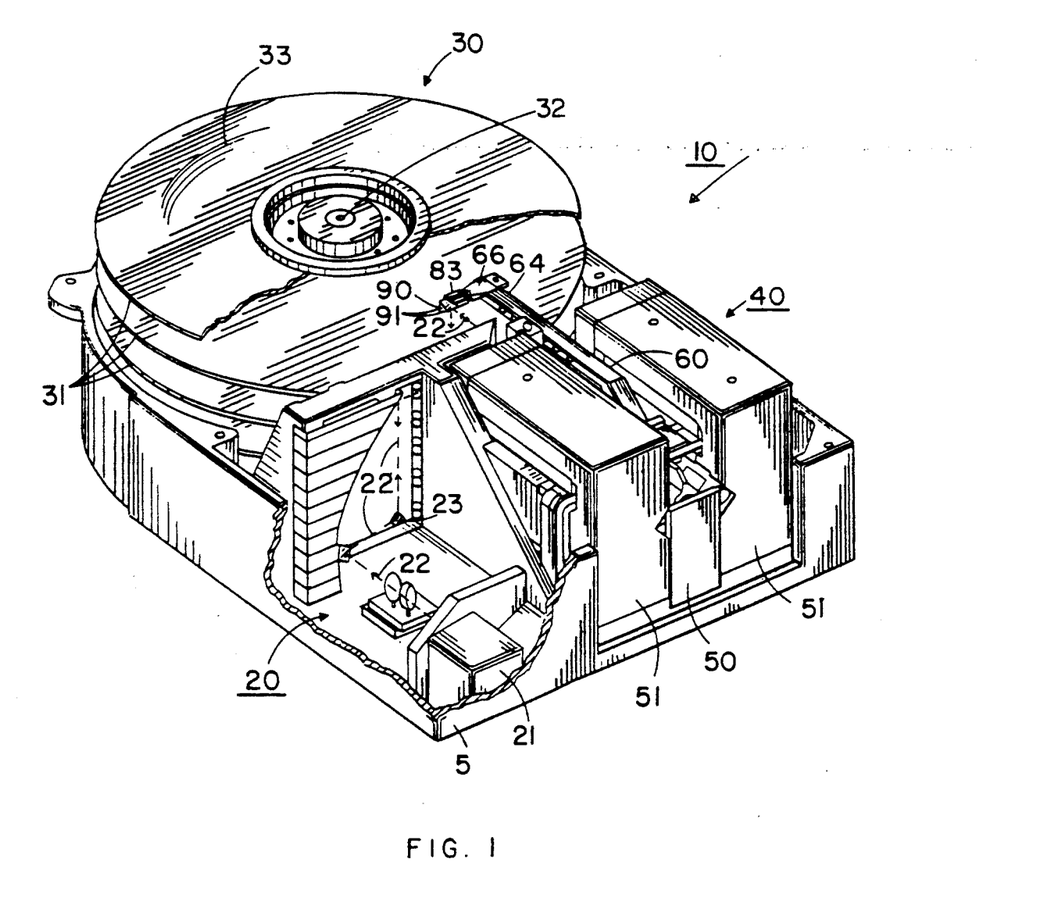
FIG. 1 is a perspective view, partially broken away, of a multi-disk, magneto-optical storage system which can use the device of the present invention.

FIG. 1 shows a multi-disk magneto-optical storage system ("M-O system") 10 comprising a optical assembly 20, a disk assembly 30, and a carriage assembly 40 firmly secured on a mounting base 5.

The optical assembly 20 comprises a single stationary laser source and detector 21 emitting a lightbeam, generally indicated by a broken line 22. The directed lightbeam 22, as will be explained in further detail herein, is used to write and read information on the storage media of the disk assembly 30. For that purpose, the lightbeam 22 is concurrently distributed, by means of various stationary and movable mirrors, for example a mirrored galvanometer 23, polarizers, beam splitters, lenses, and prisms, to the various surfaces the disk assembly 30. At the recording media of the disk assembly 30, the lightbeam 22 is reflected to essentially retrace its path back to the detector 21.

The disk assembly 30 comprises a plurality of double sided disks 31 axially spaced about a rotatably mounted spindle 32. The M-O system 10 has, for example, six double sided disks 31. The top surface of the top disk and the bottom surface of the bottom disk are generally not used for information storage purposes. Thus, the M-O system 10 has, by way of example, five pairs of opposingly facing data surfaces for recording information. The disk assembly 30 is compatible with a so called "5¼ inch" form factor drive. The term "form factor" means the external outline, (height, width and length), required for the drive assembly including its on-board control electronics.

The recording media on the surfaces of the disks 31, as will be discussed in greater detail herein, are layered on a circular substrate entirely by thin-film forming techniques such as sputtering or vacuum deposition. The feature which is common to the recording media of an M-O system is a layer of magnetic material that has the axis of magnetization perpendicular to the amorphous thin-film surface and for which the Kerr effect is great.

The substrate is generally "pre-formatted" with microscopic surface relief 33 in the form of, for example, tracking grooves or servo-sampled pits to provide a physical structure for storing information. The grooves 33, when used for storing randomly accessible information, are usually formed in closely spaced concentric circles, commonly known as tracks. However, the apparatus of the invention, as disclosed herein, can also be used with substrates grooved in a spiral configuration. Spirally grooved disks are typically used with systems storing primarily sequentially accessible information.

The carriage assembly 40 comprises a linear actuator 50 and carriage body 60. The linear actuator 50 includes two motor housings 51 containing permanent magnets, spaced apart and secured to the mounting base 5 with the carriage body 60 disposed therebetween. The carriage body 60, includes a plurality of integrally formed cantilevered carriage arms 64. The carriage arms 64 are vertically ganged one above one the other. There are, for example, five carriage arms 64 for insertion between the six disks 31 of the disk assembly 30. Each of the carriage arms 64 is identically shaped and dimensioned for positioning the read/write head assemblies 66 adjacent to the recording layers of the disks 31.

Figure 2:
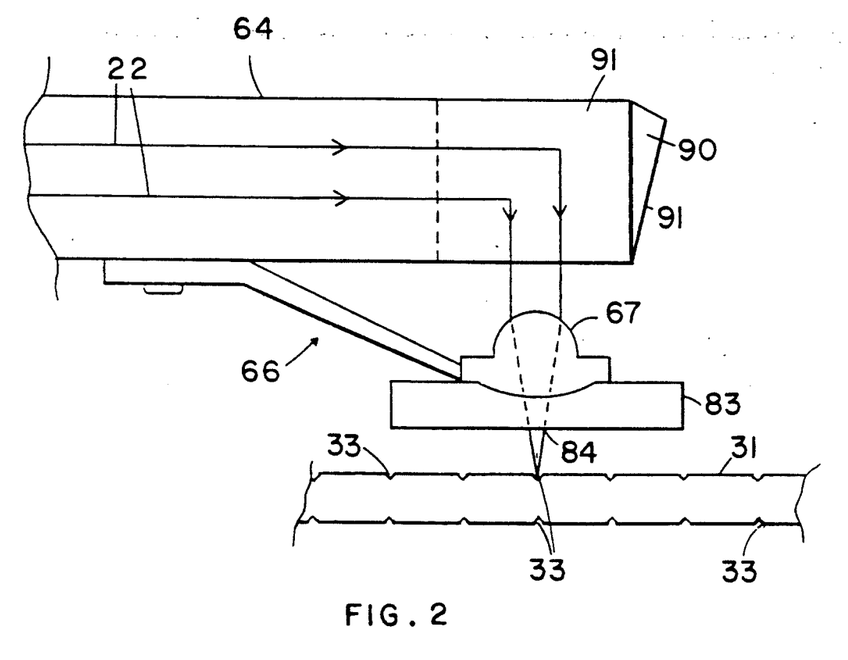
FIG. 2 is a side elevated view, partially broken away of the head assembly and disk of FIG. 1.

Now also with reference to FIG. 2, each of the head assemblies 66 comprises an objective lens 67 for focusing the lightbeam 22. The head assembly 66 also includes a slider 83 having a miniature magnetic coil, not shown, for polarizing the recording media of the disk 31, and a microscopic optical aperture 84 for the focused lightbeam 22 to pass through. Also attached at one free end of each of the carriage arm 64 is a triangular or prismatically shaped mirror, hereinafter referred to as folding prism 90. Each prism 90 has two planar reflective surfaces 91 arranged at ninety degrees with respect to each other for directing the lightbeam 22 at one of the objective lens 67 which focuses the lightbeam 22 onto the surface of the disk 31.

During the operation of the M-O system 10, the laser source 21 of the optical assembly 20, typically a laser diode, emits a diverging lightbeam 22 which is collected and collimated by a lens and made circular by a prism. This circular lightbeam 22 is selectively aimed by various optical components, including lenses, mirrors, beam splitters, and prisms, at the reflective surface 91 of the folding prisms 90.

At the reflective surface 91 the horizontal lightbeam 22 is folded over into a vertical direction and directed through the objective lens 67, the optical aperture 84 in the slider 83 to be focused at the recording layer of the disks 31.

To write information a relatively high intensity lightbeam 22 is used, for example in the range of about 8 to 15 mW. The lightbeam 22 is directed at the recording layer to be time and space coincident with the biased magnetic field created by the magnetic coil of the slider 83. Heating a domain in the presence of the biased magnetic field vertically orients the amorphous magnetic layer according to the orientation of the external magnetic field.

To read information, a relatively low intensity polarized lightbeam 22 is used, for example in the range of about 2.0 to 2.5 mW, depending on the rotational frequency of the spinning disks 31. During reading, the polarized lightbeam 22 is rotated clockwise or counterclockwise through an angle in the range of about 0.6 to 2.0 degrees at the recording layer by the Kerr effect. The lightbeam 22 is reflected at the surface of the disk 31 to essentially retrace its path to a polarizing beam splitter and optical detector 21 for decoding the polarization-modulated lightbeam 22 into bits of information.

During the operation of the M-O system 10 the double sided disks 31 are rotated at high speed, for example in the range of 2400 to 4800 revolutions per minute, by an electrical motor not shown. The sliders 83 are low-mass, low-profile, and air-bearing designed to fly at a height in the range of about 20 to 80 microinches above the surfaces of the double sided disks 31. To write or read information on the surfaces of the disks 31 the carriage body 60 is approximately positioned above a predetermined track, (commonly known as coarse seeking), and the lightbeam 22 is directed by the galvanometer 23 at the corresponding reflective surface 91 of the prisms 90. The lightbeam 22 is deflected by the reflective surface 91 to the objective lens 67 and focused by the components of the optical assembly exactly on one of the tracks of the disks 31 (commonly known as fine seeking).

Figure 3:
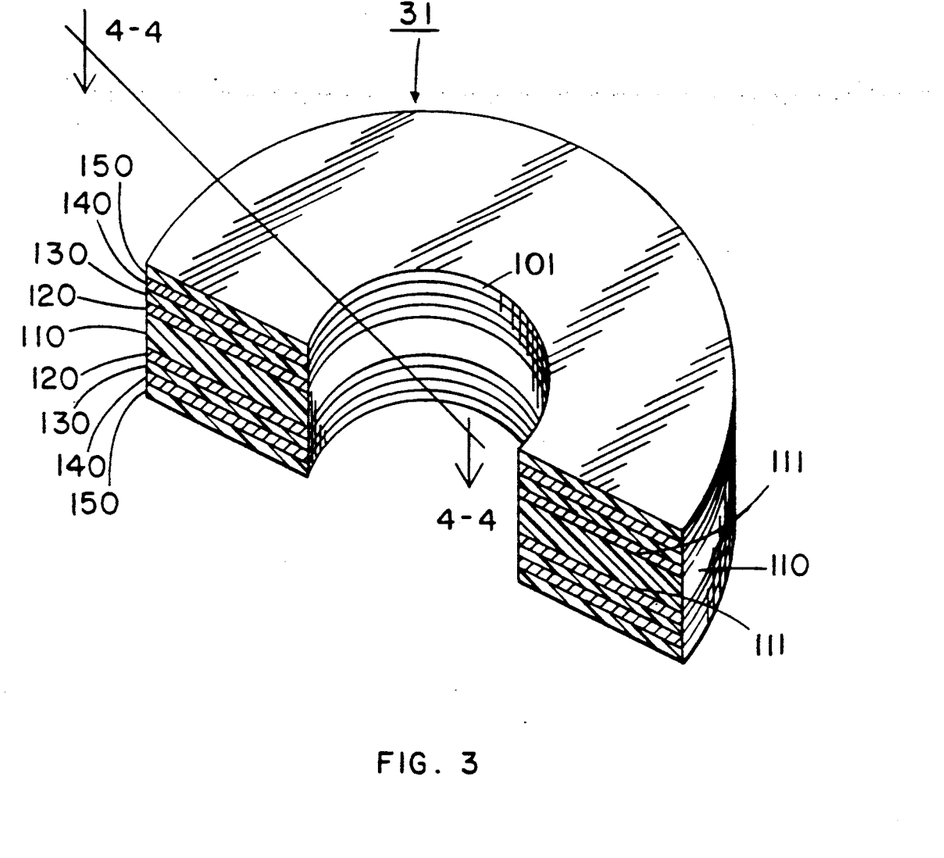
FIG. 3 is a fragmentary perspective view of a double-sided disk according to the present invention.

Now, with reference to FIG. 3, each of the disks 31, according to the invention comprise a single substrate 110 having a quadri-layer structure symmetrically formed on each side surface 111 thereof. As an advantage of the invention, the active layers of the recording media are formed entirely as thin-film layers which provide the disks 31 with a transparent, low stiction, and asperity-controlled external surface topology compatible with the air incident lightbeam 22 and the low-flying read/write head assembly 66. That is, by using thin-film layers, the asperity or roughness of the outer surface of the disks 31 can be maintained at less than 60% of the predetermined fly height of the heads 66, nominally in the range of 20 to 80 microinches. The layers comprise in order, from the substrate 110 outwards, a reflective layer 120, an optional dielectric layer 130, a recording layer 140, and a protective layer 150.

The reflective layer 120 is generally formed of a metal alloy. The dielectric layer 130 is formed of a transparent material such as silicon nitride or aluminum nitride. For magneto-optical recording media there are well known a number of materials suitable for the recording layer 140, for example, materials made of a rare-earth transition-metal alloy, such Tb-Fe-Co. The Curie temperature, that is the temperature at which the coercivity of the material is negligible, for a Tb-Fe-Co alloy is, for example, in the range of about 180 to 220 degrees Celsius. The compensation point temperature, which can be made lower than the Curie temperature by adjusting the relative proportions of rare-earth and transition metal components of the alloy, is in the range of about 60 to 130 degrees Celsius. The outer protective outer layer 150 is formed of a transparent dielectric, by way of example, silicon nitride, specifically compatible with low-flying, air-bearing sliders 83.

In order that those skilled in the art will better understand the practice of the present invention, an example of the present invention is given below by way of illustration and not by way of limitation.

Figure 4:
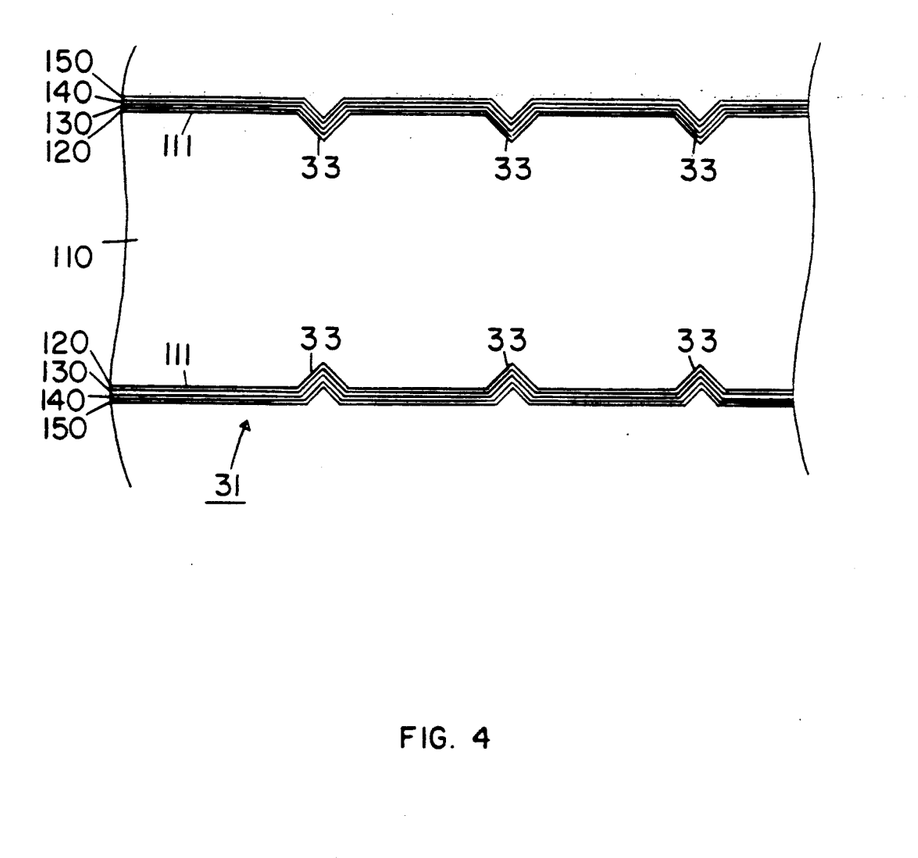
FIG. 4 is a cross-sectional view, partially broken away, of the disk of FIG. 3 along line 4—4.

As shown in FIGS. 3 and 4, a grooved or "pre-formatted" disk 31 is prepared by: 1) molding a substrate 110 from a light weight, low warpage material, for example, polycarbonate or a similarly characterized polymers; or 2) photopolymer ("2P") replication of a substrate; or 3) chemically etching (contact printing) of a substrate made from a material such as glass or aluminum. Since the light beam 22 is air incident, and not through the substrate 110 (substrate incident), as in most conventional M-O disks, the optical quality of the disk is of minimal concern. For example, the substrate 110 does not need to be corrected for birefringence or transmittance. As an advantage of the present invention, the substrate material can be selected to optimize weight, rigidity, durability, and cost.

The substrate 110 has an outer diameter of 130 mm, to make a so called industry standard "5¼ inch" disk. The substrate 110 is formed with a centrally located circular hole 101 for mounting the fabricated disk 31 axially about the spindle 32 of the M-O device, as shown in FIG. 3. The inner diameter of the hole 101 is 40 mm. The substrate has a nominal thickness of 1.2 mm.

Each side surface 111 of the substrate 110 includes a relief in the form of a plurality of conventional concentric grooves 33, as shown not to scale in FIG. 4, commonly known as tracks. The grooves 33 which provide a physical structure for facilitating the guiding of the lightbeam 22 during operation of the M-O device 10 are, by way of example, spaced apart about 1.0 um. The grooves 33 have, nominally, a width of about 0.4 um, and a depth of 0.1 um. The profile of the grooves 33 is, for example, V-shaped. Although a M-O device 10 of the type that is used for random access typically has a grooved geometry that is concentric, disks having grooves formed in a spiral geometry may also be used by the device according to the invention.

Since the size of the optical components in the M-O read/write head assemblies 66 requires a large inter-disk spacing compared to magnetic disk drives, dynamic head loading becomes a practical problem. Therefore, each side surface 111 of the substrate 110 can optionally include an annular non-grooved zone above which the head assemblies 66 are positioned during loading and unloading to improve reliability. During the operation of the M-O device 10, when the sliders 83 are loaded or unloaded, they are positioned above the non-grooved zone. Thus, should there be an accidental touch-down on the surfaces of the disks 31 during operation, recorded information will not be destroyed. Also, if a non-grooved zone is included, the disk 31 can be used with a M-O device 10 of the type that use static contact start/stop head loading techniques. With static contact start/stop loading the sliders 83 are resting or sliding on the surfaces of the disks 31 until the disks 31 attain sufficient angular velocity to permit the sliders 83 to fly at their normal operational height above the surface.

Built up on each side of the thus grooved surface 111 of the substrate 110 are the various thin-film layers that comprise the active recording media. Since each side surface 111 of the substrate 110 is built up as a mirror image of the other, the various layers will only be described with respect to one of the side surfaces 111. The layers are generally applied by conventional, thin-film coating techniques such as vacuum deposition or sputtering. Such techniques, are well known in the art, and therefore do not require further description herein.

The reflective layer 120 is formed of a metal, for example, preferably an aluminum alloy. The purpose of the reflective layer 120 is to reflect the lightbeam 22 back through the recording layer 130, where destructive interference of the incident polarization enhances light absorption, thereby enhancing media sensitivity and Kerr rotation. Furthermore, the thickness of the reflective layer 120 can be adjusted to tune and optimize the thermal characteristics of the media. It has been determined that good reflective results can be obtained by having the reflective layer 120 be in the range of about 200 to 500 Angstrom thick for a polycarbonate substrate 110. However, other thicknesses may be optimal for a substrate 110 made of a glass or metallic material.

The transparent dielectric layer 130 is formed on the reflective layer 120 and typically comprises aluminum nitride or silicon nitride. The purpose of the dielectric layer is to enhance the Kerr effect and also to provide a corrosive resistant boundary between the reflective layer 120 and the recording layer 140. Good isolating results have been obtained with a dielectric layer 130 having a thickness in the range of about 150 to 400 Angstrom thick.

The recording layer 140 is formed on the dielectric layer 130. The recording layer generally comprises a vertically oriented, amorphous magnetic material, for example, a rare-earth transition-metal alloy, such as Tb-Fe-Co. The purpose of the recording layer is to provide the media with the capability to store information in vertically biased magnetic domains. The domains have a length in the circumferential direction in the range of about 0.6 to 0.9 micrometer. Typically, the recording layer 140 is about 150 to 500 Angstrom thick, although other thin-film thicknesses may be appropriate for amorphous magnetic materials of different composition.

The protective layer 150 is formed on the recording layer 140. One purpose of the protective layer 150 is to prevent corrosion of the recording layer 140. In addition, as another purpose, the surface of the protective layer 150 must be compatible with the low-mass, air-bearing sliders 83 comprising, for example, an aluminum oxide, titanium carbide ($Al_2O_3$-TiC) material. Experimentation with various materials has revealed that not all known protective coatings for M-O medium, for example, aluminum nitride, silicon carbide, or silicon dioxide, would allow the low-mass sliders 83 to fly reliably at low-heights, for example in the range of 20 to 80 microinches. That is, with such tribologically incompatible materials the sliders 83 would eventually fatally crash onto the surface of the media. According to the present invention, the preferred material for the protective layer 150, compatible with the low-mass air-bearing sliders 83 is silicon nitride ($Si_3N_4$). The protective layer 150 of silicon nitride having low-stiction and minimal asperity has a thickness in the range of about 400 to 800 Angstrom.

Advantages of the double-sided single substrate disk according to the present invention, heretofore unobtainable by the prior art, include a low-profile magneto-optical media which can used with a reduced height multidisk stack. Also, the disk can be made with less steps, and with lower cost materials. The double-sided, air-incident substrate as disclosed herein is of reduced weight and therefore consumes less power during operation. Furthermore, the low-stiction, asperity-controlled disk is compatible with a dynamically loadable flying read/write head, permitting greater recording densities.

While certain representative embodiments and details have been shown for the purpose of illustrating the invention, it will be apparent to those skilled in the art that various changes and modifications may be made in this invention without departing from its true spirit or scope which is indicated by the following claims.

What is claimed:

1. A magneto-optical disk for use with a lightbeam and an air-bearing low-flying read/write head of a rotary disk device for storing information comprising:
   a substrate having a microscopic relief formed on a side surface thereof to provide a pre-formatted structure for storing information;
   a thin-film reflective layer applied on said side surface to reflect an incident lightbeam used for reading and writing information;
   a transparent thin-film dielectric layer applied on said reflective layer to isolate said reflective layer;
   an optically sensitive thin-film recording layer applied on said dielectric layer, the composition of said recording layer including a rare-earth transition-metal to magnetically store information; and
   a transparent thin-film protective layer applied on said recording layer, the asperity of the surface of said protective layer being generally not greater than 60% of the predetermined fly height of the air-bearing low-flying read/write head, and the composition of said protective layer having stiction sufficiently weak to allow the read/write head to fly over the disk at said predetermined height during operation of the disk in a rotary disk device.

2. The disk as in claim 1 wherein said dielectric, recording, and protective thin-film layers are transparent to be compatible with an air incident lightbeam.

3. The disk as in claim 1 wherein said disk is about 1.2 mm thick.

4. The disk as in claim 1 wherein said relief includes a plurality of spaced closely concentric grooves or a spiral groove.

5. The disk as in claim 1 wherein said side surface is partitioned into a first and second annular zone, that portion of said side surface in said first annular zone including said relief, and that portion of said side surface in said second annular zone being substantially flat.

6. The disk as in claim 1 wherein said substrate is optically opaque.

7. The disk as in claim 1 wherein said substrate is made of polycarbonate, glass, or aluminum.

8. The disk as in claim 1 wherein the predetermined fly height of the low-flying air-bearing read/write head is generally in the range of 20 to 80 microinches.

9. The disk as in claim 1 wherein said protective layer includes silicon nitride for use with a read/write head made of an aluminum-oxide-carbide material.

10. The disk as in claim 1 further including a microscopic relief formed on a second side surface thereof to provide a pre-formatted structure for storing information;
    a second thin-film reflective layer applied on said second side surface to reflect an incident lightbeam used for reading and writing information;
    a second transparent thin-film dielectric layer applied on said second reflective layer to isolate said second reflective layer;
    an second optically sensitive thin-film recording layer applied on said second dielectric layer, the composition of said second recording layer including a rare-earth transition-metal to magnetically store information; and
    a second transparent thin-film protective layer applied on said second recording layer, the asperity of the surface of said second protective layer being less than 60% of the predetermined fly height of the air-bearing low-flying read/write head, and the composition of said second protective layer having stiction sufficiently weak to allow the read/write head to fly over the disk at a predetermined height during operation of the disk in a rotary disk device.

11. A double sided optically sensitive media for a storing information in a high storage density information storage system comprising:
    a substrate having two side surfaces, each of said side surfaces having a microscopic relief formed on an annular portions thereof;
    a thin-film reflective layer on each of said side surfaces of said substrate to reflect a lightbeam;
    a transparent thin-film dielectric layer on each of said reflective layers to isolate said reflective layers;
    an optically sensitive thin-film recording layers on each of said dielectric layers, the composition of said recording layers including a rare-earth transition-metal to magnetically store information; and
    a transparent thin-film protective layer on each of said recording layers, the composition of said protective layers having stiction sufficiently weak and asperity sufficiently low to allow a read/write heads to fly over the double sided media at a predetermined low height during operation of the information storage system.

12. The media as in claim 11 wherein said protective layer is silicon nitride.

13. The media as in claim 12 wherein the predetermined fly height of said read/write head is less than 80 microinches.

14. A high density magneto-optical storage system for storing information comprising:
    a plurality of disks axially mounted on a rotatable spindle, each of said disks having two side surfaces;
    a plurality of air-bearing low-flying read/write heads to read and write information on said plurality of disks;
    each of said disks including a substrate having a microscopic relief formed on each of said side surfaces to provide a pre-formatted structure for storing information;
    a thin-film reflective layer on each of said side surfaces to reflect a lightbeam used for reading and writing information;
    a transparent thin-film dielectric layer on each of said reflective layers to isolate said reflective layers;
    an optically sensitive thin-film recording layer on each of said dielectric layers, the composition of said recording layer including a rare-earth transition-metal to magnetically store information; and
    a transparent thin-film protective layer on each of said recording layer, the composition of said protective layers having weak stiction and low asperity being effective to allow said read/write heads to fly over said side surfaces of said disks during operation of the information storage system.

15. The system as in claim 14 wherein said plurality of disks are spaced apart less than 1 cm and each of said disks is about 1.2 mm thick.

16. The system as in claim 14 including at least six disks on said spindle.

17. The system as in claim 14 wherein said light beam is air incident on said side surfaces of said plurality of disks.

18. The system as in claim 14 wherein the fly height of said read/write heads is less than 80 microinches.

19. The system as in claim 14 wherein the asperity is substantially less than 60% of the fly height of said read/write heads.

20. A method for making a magneto-optical disk for use with an air-incident lightbeam and an air-bearing low-flying read/write head of a rotary disk device for storing information comprising the steps of:

forming a substrate;

forming a microscopic relief formed on a side surface of said substrate to provide a pre-formatted structure for storing information;

applying a thin-film reflective layer on said side surface to reflect a lightbeam used for reading and writing information;

applying a transparent thin-film dielectric layer on said reflective layer to isolate said reflective layer;

applying an optically sensitive thin-film recording layer on said dielectric layer, the composition of said recording layer including a rare-earth transition-metal to magnetically store information; and applying a transparent thin-film protective layer applied on said recording layer, the composition of said protective layer having weak stiction and low asperity to allow a read/write head to fly over said side surface at a predetermined height during operation of the disk in a rotary disk device.

21. The method as in claim 20 further including the step of forming said relief as a plurality of spaced closely concentric grooves or a spiral groove.

22. The method as in claim 20 further including the steps of partitioning said side surface into a first and second annular zone, forming said relief in that portion of said side surface in said first annular zone, and making that portion of said side surface in said second annular zone substantially flat.

23. The method as in claim 20 further including the step of reducing the asperity and stiction of said side surface to permit an air-bearing low-flying read/write head to fly over said side surface at a height in the range of about 20 to 80 microinches.

24. A thin-film, double sided, magneto-optical media for storing information by means of an air incident lightbeam comprising:

a substrate having two side surfaces, each of said side surfaces having a microscopic relief to provide a pre-formatted structure for storing information;

a thin-film reflective layer on each of said side surfaces to reflect an incident lightbeam used for reading and writing information;

an optional transparent thin-film dielectric layer on each of said reflective layers to isolate said reflective layers;

an optically sensitive thin-film recording layer applied on each of said dielectric layers, the composition of said recording layers including a rare-earth transition-metal to magnetically store information; and a transparent thin-film protective layer on each of said recording layers to minimize corrosion of said recording layers.

* * * * *

UNITED STATES PATENT AND TRADEMARK OFFICE
CERTIFICATE OF CORRECTION

PATENT NO. : 5,202,880
DATED : April 13, 1993
INVENTOR(S) : Lee et al

It is certified that error appears in the above-indentified patent and that said Letters Patent is hereby corrected as shown below:

Title Page, [75] Inventors:

Please change "Brian to Kwan Yui".

Signed and Sealed this

Twenty-sixth Day of July, 1994

Attest:

BRUCE LEHMAN

Attesting Officer

Commissioner of Patents and Trademarks